(12) United States Patent
Horade

(10) Patent No.: US 10,336,065 B2
(45) Date of Patent: Jul. 2, 2019

(54) INKJET RECORDING APPARATUS CAPABLE OF CONFIRMING WITH USER WHETHER INK CHAMBERS HAVE BEEN REFILLED WITH INK

(71) Applicant: BROTHER KOGYO KABUSHIKI KAISHA, Nagoya-shi, Aichi-ken (JP)

(72) Inventor: Kenta Horade, Tokai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/875,049

(22) Filed: Jan. 19, 2018

(65) Prior Publication Data
US 2018/0207930 A1    Jul. 26, 2018

(30) Foreign Application Priority Data

Jan. 20, 2017    (JP) ................................ 2017-008433

(51) Int. Cl.
*B41J 2/045*    (2006.01)
*H04N 1/00*    (2006.01)
(Continued)

(52) U.S. Cl.
CPC ....... *B41J 2/04536* (2013.01); *B41J 2/04586* (2013.01); *B41J 2/1752* (2013.01);
(Continued)

(58) Field of Classification Search
CPC .... B41J 2/04536; B41J 2/17513; B41J 29/13; B41J 2/17553; B41J 2/1752; B41J 29/38;
(Continued)

(56) References Cited

U.S. PATENT DOCUMENTS

2010/0026741 A1*  2/2010  Gold ..................... B41J 2/0057
                                                         347/7
2016/0059571 A1   3/2016  Kobayashi
(Continued)

FOREIGN PATENT DOCUMENTS

CN    103171307 A    6/2013
JP    2012-201101 A  10/2012
(Continued)

OTHER PUBLICATIONS

Related U.S. Appl. No. 15/874,980, filed Jan. 19, 2018.
(Continued)

*Primary Examiner* — Lisa Solomon
(74) *Attorney, Agent, or Firm* — Merchant & Gould P.C.

(57) ABSTRACT

An inkjet recording apparatus includes: a tank; a recording head; a display; an operation interface; a memory; and a controller. The controller performs: an inquiry process in which a displaying and receiving process is repeatedly performed for each of ink chambers of the tank to inquire whether ink has been injected into a target ink chamber; an operation determination process to determine whether all of operations received in the inquiry process are first operations; and, in response to the determination in the operation determination process that all of the operations received in the inquiry process are first operations, a confirmation process to prompt a user to input a third operation to confirm that ink has been injected into all of the ink chambers. The controller initializes, in response to receipt of the third operation in the confirmation process, count values for all of the ink chambers.

13 Claims, 9 Drawing Sheets

(51) Int. Cl.
- *B41J 2/175* (2006.01)
- *B41J 29/13* (2006.01)
- *B41J 29/38* (2006.01)

(52) U.S. Cl.
CPC ....... *B41J 2/17513* (2013.01); *B41J 2/17553* (2013.01); *B41J 29/13* (2013.01); *B41J 29/38* (2013.01); *H04N 1/00506* (2013.01); *H04N 2201/0094* (2013.01)

(58) Field of Classification Search
CPC ............. B41J 2/04586; H04N 1/00506; H04N 2201/0094
See application file for complete search history.

(56) References Cited

U.S. PATENT DOCUMENTS

| | | |
|---|---|---|
| 2016/0207337 A1 | 7/2016 | Honoki et al. |
| 2016/0207339 A1 | 7/2016 | Honoki |

FOREIGN PATENT DOCUMENTS

| | | |
|---|---|---|
| JP | 2013-152685 A | 8/2013 |
| JP | 2016-132218 A | 7/2016 |
| JP | 2016-132220 A | 7/2016 |
| JP | 2016-132221 A | 7/2016 |
| WO | 2014/034109 A1 | 3/2014 |

OTHER PUBLICATIONS

Related U.S. Appl. No. 15/874,959, filed Jan. 19, 2018.
Related U.S. Appl. No. 15/875,073, filed Jan. 19, 2018.
Related U.S. Appl. No. 15/875,030, filed Jan. 19, 2018.
Office Action (Notice of Allowance) issued in related U.S. Appl. No. 15/875,030, dated Jan. 17, 2019.
InnovationQ Plus—IP.com search, Jan. 2, 2019, pp. 1-2.
Office Action (Notice of Allowance) issued in related U.S. Appl. No. 15/875,073, dated Mar. 11, 2019.
Notification of First Office Action issued in related Chinese Patent Application No. 201810052718.3, dated Apr. 23, 2019.

* cited by examiner

INKJET RECORDING APPARATUS CAPABLE OF CONFIRMING WITH USER WHETHER INK CHAMBERS HAVE BEEN REFILLED WITH INK

CROSS REFERENCE TO RELATED APPLICATION

This application claims priority from Japanese Patent Application No. 2017-008433 filed Jan. 20, 2017. The entire content of the priority application is incorporated herein by reference.

TECHNICAL FIELD

The present disclosure relates to an inkjet recording apparatus configured to record an image on a sheet.

BACKGROUND

Japanese patent application publication No. 2016-132221 discloses one example of an inkjet recording apparatus provided with refillable ink tanks. A user injects ink from an ink bottle into an ink chamber of the ink tank through an inlet formed in the ink tank. The conventional inkjet recording apparatus also prompts the user to indicate whether the ink chamber has been refilled with ink when inferring that a refilling process has been performed. In response to the user operation to indicate that the ink chamber has been refilled, the conventional inkjet recording apparatus initializes a count value indicative of a residual ink quantity for the ink chamber.

SUMMARY

However, when one such conventional inkjet recording apparatus displays a screen prompting the user to indicate whether each ink chamber has been refilled, there is a chance that the user will repeatedly input an operation indicating a response "YES" to each inquiry, without actually reading the inquiry. If the inkjet recording apparatus initializes the count values in response to the "YES" inputs even though the ink chambers have not been refilled with ink, the count values for the ink chambers would never reach their respective threshold values even when the ink chambers run out of ink. This prevents the inkjet recording apparatus from determining that the ink chambers have entered an empty state. As a consequence air in the ink chambers would flow into a recording head of the inkjet recording apparatus, requiring ink or user operation to restore the inkjet recording apparatus to a state in which the recording head can eject ink.

In view of the foregoing, it is an object of the disclosure to provide an inkjet recording apparatus that performs an inquiry process for prompting a user to indicate whether ink has been injected into ink chambers and that can reliably compel the user to confirm whether the ink chambers have been refilled when the same input is received repeatedly in the inquiry process.

In order to attain the above and other objects, according to one aspect, the disclosure provides an inkjet recording apparatus including: a tank; a recording head; a display; an operation interface; a memory; and a controller. The tank has: a plurality of ink chambers each configured to store ink therein; and a plurality of inlets provided in one-to-one correspondence with the plurality of ink chambers. Ink is injected into each of the plurality of ink chambers through corresponding one of the plurality of inlets. The recording head is configured to eject the ink stored in each of the plurality of ink chambers to record an image on a sheet. The display is configured to display a screen. The operation interface is configured to receive a plurality of operations inputted by a user. The plurality of operations includes a first operation, a second operation and a third operation. The operation interface is further configured to output operation signals in response to receptions of the plurality of operations. The memory is configured to store: threshold values, each of the threshold values being set for each of the plurality of ink chambers; count values, each of the count values being set for each of the plurality of ink chambers and updated in a direction approaching corresponding one of the threshold values in accordance with ejection of the ink stored in corresponding one of the plurality of ink chambers from the recording head; and the operation signals outputted from the operation interface. The controller is configured to control the recording head and the display. The controller is configured to: perform an inquiry process in which a displaying and receiving process is repeatedly performed for each of the plurality of ink chambers, wherein, in the displaying and receiving process, an inquiry screen targeting each of the plurality of ink chambers and including an inquiry to the user as to whether ink has been injected into a target ink chamber is displayed on the display, and an operation is received, through the operation interface, in response to the inquiry, the operation received in the displaying and receiving process being one of the first operation and the second operation; perform an operation determination process to determine whether all of the operations received in the inquiry process are the first operations; perform, in response to the determination in the operation determination process that all of the operations received in the inquiry process are the first operations, a confirmation process to display a confirmation screen on the display and to receive one of the first operation and the third operation through the operation interface, the confirmation screen prompting the user to input the third operation to confirm that ink has been injected into all of the plurality of ink chambers; and initialize, in response to the receipt of the third operation in the confirmation process, the count values for all of the plurality of ink chambers.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1A:
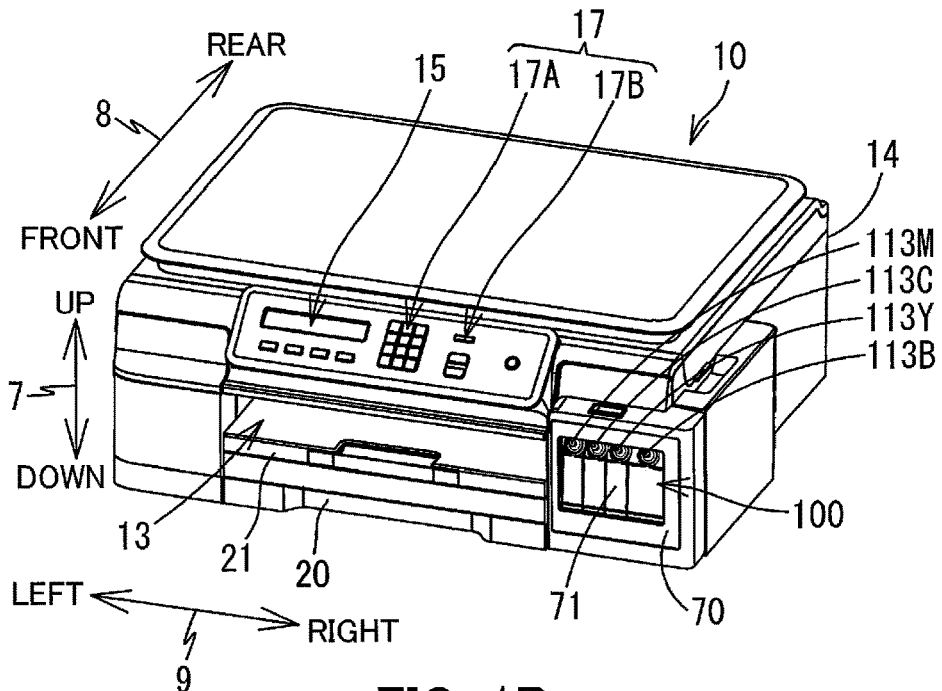
FIG. 1A is a perspective view of a multifunction peripheral (MFP) 10 according to one embodiment, in which a cover 70 of the MFP 10 is closed.

A multifunction peripheral (hereinafter abbreviated as "MFP") 10 as an example of an inkjet recording apparatus according to one embodiment will be described with reference to the accompanying drawings, wherein like parts and components are designated by the same reference numerals to avoid duplicating description.

Note that the embodiment described below is merely an example of the disclosure and may be modified in many ways without departing from the scope of the disclosure.

In the following description, an up-down direction 7 is defined based on an orientation of the MFP 10 when the MFP 10 is ready to use (hereinafter referred to as an "operable posture"); a front-rear direction 8 is defined so that a side of the MFP 10 in which a discharge opening 13 is formed is a front side; and a left-right direction 9 is defined based on a perspective of an user facing the front side of the MFP 10.

<Overall Structure of MFP 10>

As illustrated in FIGS. 1A, 1B, 2, and 5, the MFP 10 includes a feed tray 20, a discharge tray 21, a conveying section 23, a recording section 24, and an ink tank 100. The ink tank 100 is an example of a tank. These components of the MFP 10 are accommodated in a casing 14 having a general rectangular parallelepiped shape. The MFP 10 has a printer function for recording images on sheets according to an inkjet recording method. The MFP 10 may also have other functions, such as a facsimile function and a scanning function. The MFP 10 is an example of an inkjet recording apparatus.

<Feed Tray 20 and Discharge Tray 21>

Figure 1B:
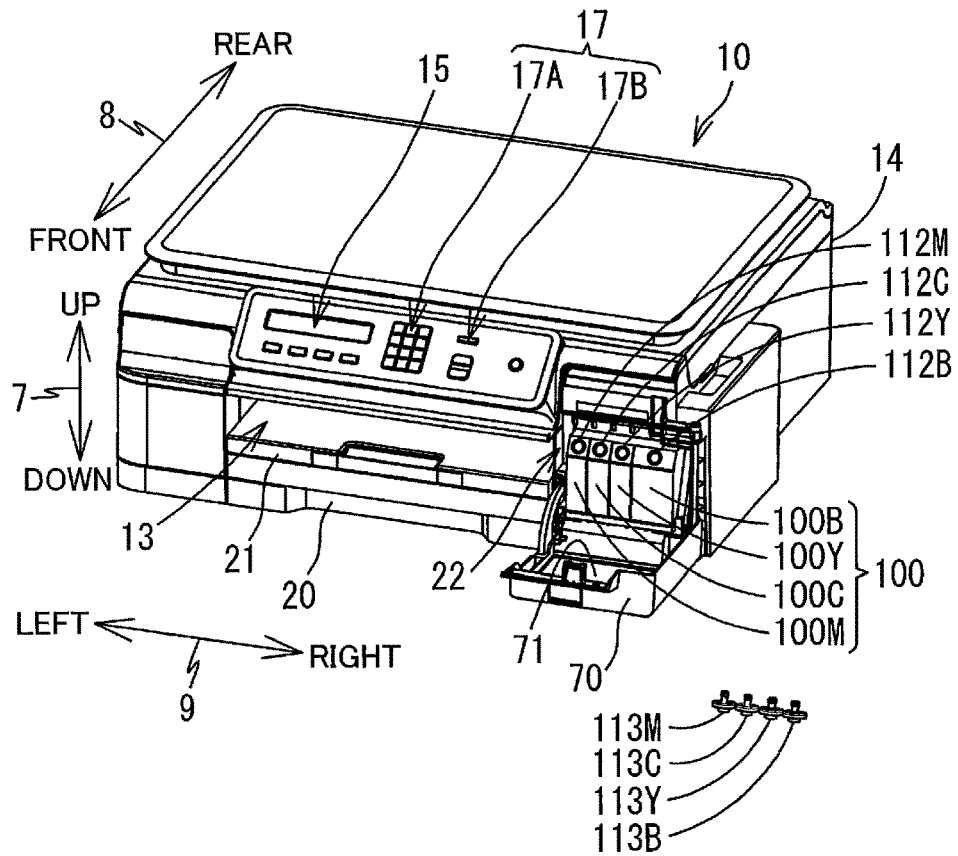
FIG. 1B is a perspective view of the MFP 10 according to the embodiment, in which the cover 70 is open.

As illustrated in FIGS. 1A and 1B, the discharge opening 13 is formed in a front surface of the casing 14 at its center region in the left-right direction 9. The feed tray 20 is inserted into and removed from the casing 14 through the discharge opening 13 in the front-rear direction 8. The feed tray 20 can support a plurality of sheets in a stacked state. The discharge tray 21 is disposed above the feed tray 20. The discharge tray 21 is inserted into and removed from the casing 14 together with the feed tray 20. The discharge tray 21 supports sheets discharged by the conveying section 23.

<Conveying Section 23 and Recording Section 24>

The conveying section 23 is configured to convey the sheets supported on the feed tray 20 along a conveying path that leads to the discharge tray 21 while passing through a position in which the sheets confront the recording section 24. The conveying section 23 includes a plurality of rollers and the like that rotate while in contact with the sheets, for example. The recording section 24 is configured to record images on sheets conveyed by the conveying section 23 by ejecting ink stored in the ink tank 100. The recording section 24 includes a carriage that is movable in a main scanning direction crossing a direction in which the sheets are conveyed, and a recording head that is mounted on the carriage and configured to eject ink from nozzles, for example. The recording section 24 is an example of a recording head.

Figure 2:
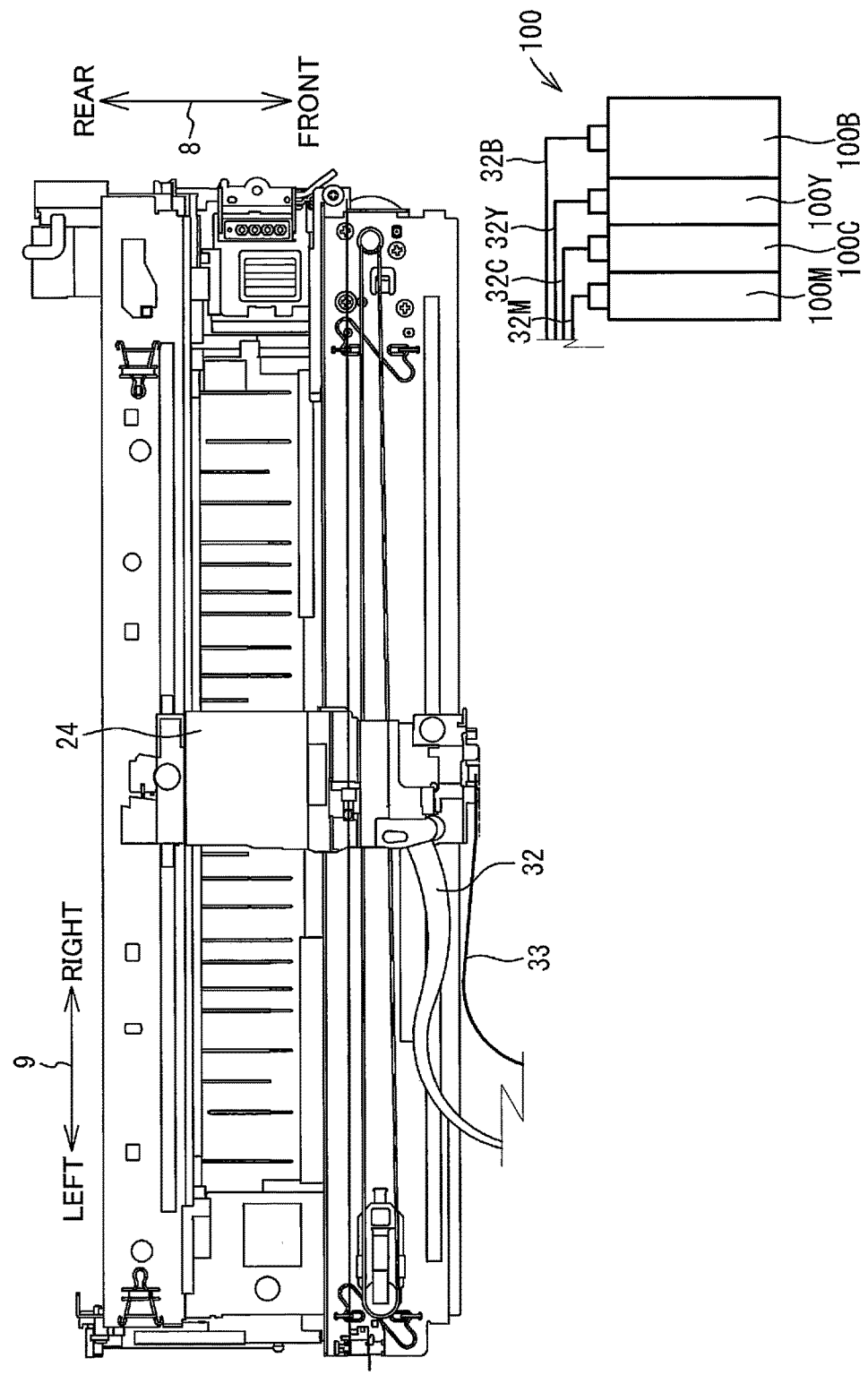
FIG. 2 is a plan view of a recording section 24 and an ink tank 100 of the MFP 10 according to the embodiment.

As illustrated in FIG. 2, ink tubes 32 and a flexible flat cable 33 are connected to the recording section 24. The ink tubes 32 are configured to supply ink stored in the ink tank 100 to the recording section 24. More specifically, the ink tubes 32 include four ink tubes 32B, 32Y, 32C, and 32M (hereinafter collectively referred to as the ink tubes 32) for allowing ink of four colors, i.e., black, magenta, cyan, and yellow, to flow therethrough, respectively. The ink tubes 32 are bundled together, with one end of the ink tubes 32 connected to and extending from the ink tank 100 and the other end connected to the recording section 24. The flexible flat cable 33 is configured to transmit control signals outputted from a controller 130 (see FIG. 5) to the recording section 24.

<Ink Tank 100>

As illustrated in FIGS. 1A and 1B, the ink tank 100 is installed in an interior space of the casing 14 at its right-front portion. That is, the ink tank 100 is fixed in the MFP 10 and cannot easily be removed from the casing 14. Here, the phrase "cannot easily be removed" is intended to mean that a general user cannot simply remove the ink tank 100 from the MFP 10 under normal operating conditions, for example. There is no need to install the ink tank 100 in such a way that makes them impossible to remove from the MFP 10.

The ink tank 100 is configured to store ink to be supplied to the recording section 24. As illustrated in FIG. 1B, the ink tank 100 includes four tanks 100B, 100Y, 100C, and 100M. Each of the tanks 100B, 100Y, 100C, and 100M stores ink of a different color. Specifically, the tank 100B stores black ink, the tank 100Y stores yellow ink, the tank 100C stores cyan ink, and the tank 100M stores magenta ink. However, the number of tanks 100B, 100Y, 100C, and 100M and the colors of ink stored therein are not limited to the above example.

The four tanks 100B, 100Y, 100C, and 100M are disposed in a row along the left-right direction 9. Of the four tanks 100B, 100Y, 100C, and 100M, the tank 100B is disposed farthest to the right while the tank 100M is disposed farthest to the left. The tank 100B has a width in the left-right direction 9 greater than that of the other tanks 100Y, 100C, and 100M. The tank 100B also has an ink chamber 111B (described later) with a capacity greater than that of ink chambers 111Y, 111C, and 111M of the other tanks 100Y, 100C, and 100M. However, arrangement of the tanks 100B, 100Y, 100C, and 100M, sizes of the tanks 100B, 100Y, 100C, and 100M, and capacities of the ink chambers 111 are not limited to the relationships described in the above example.

Figure 3:
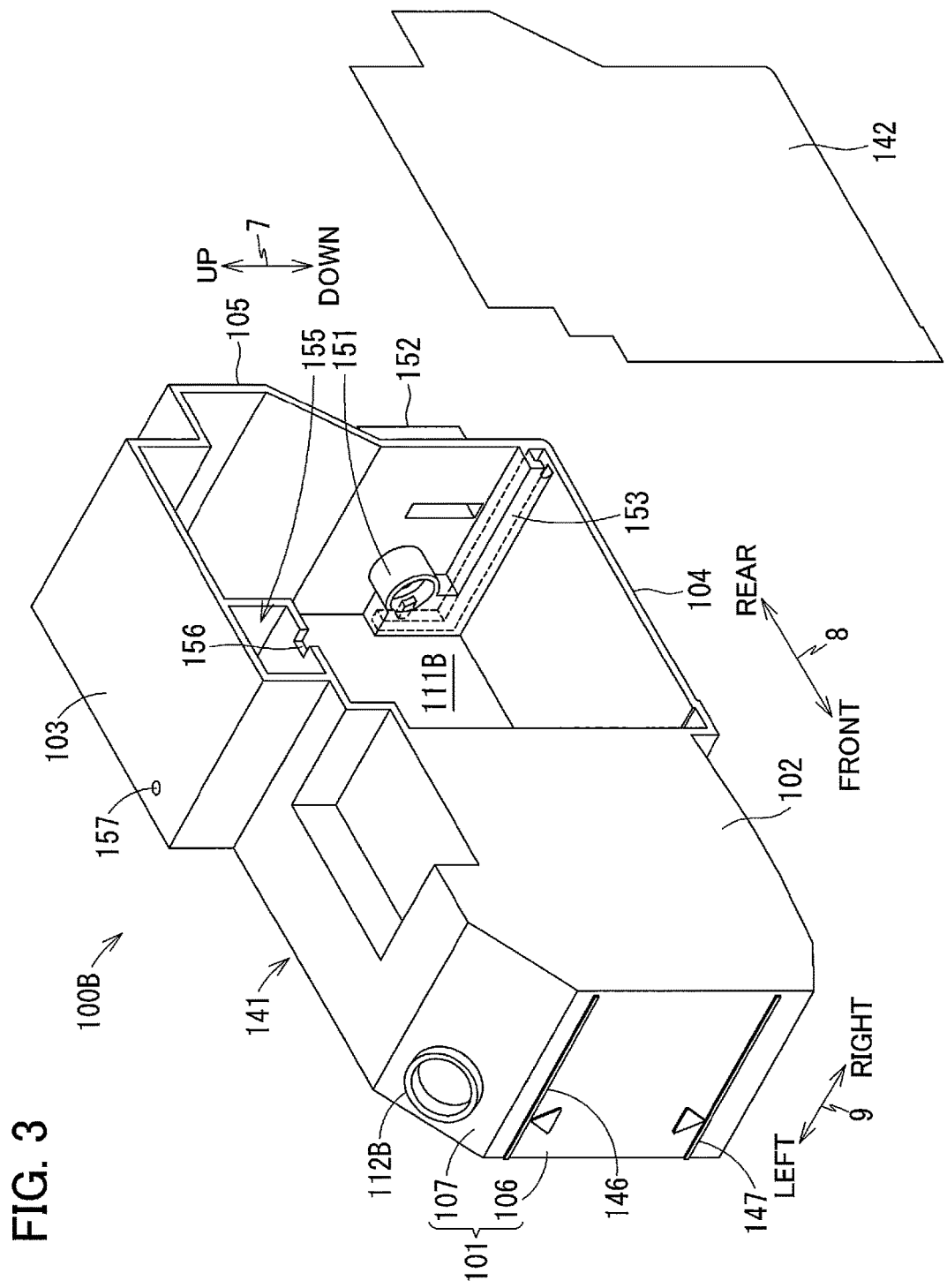
FIG. 3 is a perspective view of a tank 100B constituting the ink tank 100 as viewed from a front side thereof according to the embodiment.
Figure 4:
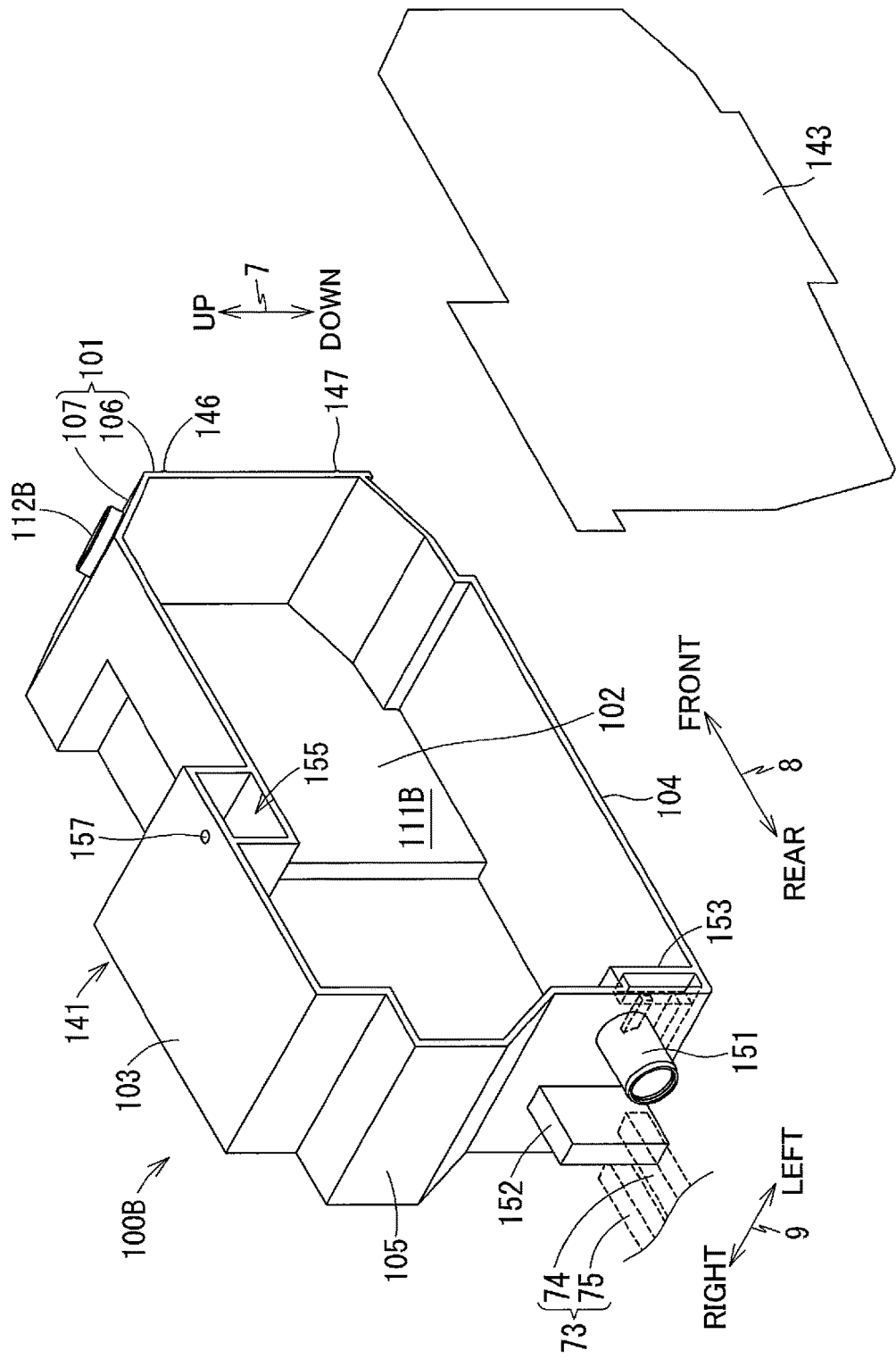
FIG. 4 is a perspective view of the tank 100B as viewed from a rear side thereof according to the embodiment.

As illustrated in FIGS. 3 and 4, the tank 100B includes a frame 141, and two films 142 and 143. The frame 141 has a general rectangular parallelepiped shape that is flattened in the left-right direction 9 such that its dimensions in the up-down direction 7 and the front-rear direction 8 are greater than its dimension in the left-right direction 9. The frame 141 is formed of a resin (polypropylene, for example) that is sufficiently translucent to allow visual recognition of ink stored in the ink chamber 111B from outside the tank 100B. The frame 141 may be integrally molded through injection molding of a resin material, for example.

The frame 141 includes a front wall 101, a right wall 102, a top wall 103, a bottom wall 104, and a rear wall 105. A left end and part of a right end of the frame 141 are open. The films 142 and 143 are melt-bonded to the frame 141 so as to seal the openings in the left and right ends of the frame 141. The interior space of the tank 100B defined by the front wall 101, the right wall 102, the top wall 103, the bottom wall 104, the rear wall 105, and the films 142 and 143 constitutes the ink chamber 111B in which the ink is stored. Note that the ink chamber 111B may instead be defined by inner walls (not illustrated) positioned inside the outer walls 101-105 of the frame 141. Further, the ink chamber 111B may be divided into a plurality of small regions by partitioning walls (not illustrated).

The front wall 101 is configured of a vertical wall 106, and a sloped wall 107. The vertical wall 106 expands in the up-down direction 7 and the left-right direction 9. The sloped wall 107 is connected between a top edge of the vertical wall 106 and a front edge of the top wall 103. The sloped wall 107 slopes relative to the up-down direction 7 and the front-rear direction 8. An inlet 112B is formed in the sloped wall 107. Ink is injected, or poured, into the ink chamber 111B through the inlet 112B. The inlet 112B penetrates the sloped wall 107 in a thickness direction thereof, allowing the ink chamber 111B to be in communication with an exterior of the tank 100B.

The inlet 112B is closed with a cap 113B. As illustrated in FIG. 1A, the cap 113B attached to the sloped wall 107 intimately contacts a surface of the sloped wall 107 defining a peripheral edge of the inlet 112B to seal the inlet 112B. As illustrated in FIG. 1B, on the other hand, the cap 113B is removed from the sloped wall 107 to open the inlet 112B. Here, the cap 113B can be attached to and removed from the sloped wall 107 while a cover 70 (described later) is in its exposing position. By removing the cap 113B from the inlet 112B, the user can inject ink into the ink chamber 111B through the inlet 112B.

As illustrated in FIGS. 3 and 4, a first line 146 and a second line 147 are provided on an outer surface of the vertical wall 106. The first line 146 and the second line 147 both extend in the left-right direction 9. When the MFP 10 is in its operable posture, the first line 146 is positioned approximately at a height in the up-down direction 7 the same as a level of ink in the ink chamber 111B when the ink chamber 111B stores ink of a preset maximum storage quantity. The maximum storage quantity corresponds to the quantity of ink stored in a single ink bottle (not illustrated), for example. When the MFP 10 is in its operable posture, the second line 147 is positioned lower in the up-down direction 7 than the first line 146 and higher in the up-down direction 7 than a detection position described later.

An ink supply portion 151 is provided at the rear wall 105. The ink supply portion 151 has a cylindrical shape with a hollow interior space. The ink supply portion 151 protrudes rearward from an outer surface of the rear wall 105. A distal end (i.e. protruding end) of the ink supply portion 151 is open. The interior space of the ink supply portion 151 is in communication with the ink chamber 111B through an ink channel 153 described later. By connecting the ink tube 32B to the ink supply portion 151 so that one end portion of the ink tube 32B is fitted onto an outer surface of the ink supply portion 151, ink stored in the ink chamber 111B is supplied to the ink tube 32B through the ink supply portion 151.

An ink detection portion 152 is provided at the rear wall 105. The ink detection portion 152 protrudes rearward from the outer surface of the rear wall 105. The ink detection portion 152 has a box shape with a hollow interior space. The ink detection portion 152 is formed of a light transmissive material that allows transmission of light irradiated from a light-emitting portion 74 described later. The interior space of the ink detection portion 152 is in communication with the ink chamber 111B. Hence, ink is present in the interior space of the ink detection portion 152 when the level of ink in the ink chamber 111B is higher than a lower edge of the ink detection portion 152. On the other hand, ink is not present in the interior space of the ink detection portion 152 when the level of ink in the ink chamber 111B is lower than the lower edge of the ink detection portion 152.

An ink channel 153 is a long narrow path for supplying ink stored in the ink chamber 111B to the ink supply portion 151. The ink channel 153 has one end that communicates with the ink chamber 111B at a position in contact with an inner surface of the bottom wall 104, and the other end that communicates with the interior space of the ink supply portion 151. More specifically, the ink channel 153 extends leftward from its communicating position with the ink chamber 111B, and then extends upward from the left end of the tank 100B, and lastly extends rightward from a position of height equal to the ink supply portion 151 in order to communicate with the interior space of the ink supply portion 151.

An air communication portion 155 is also provided in the tank 100B. The air communication portion 155 is an air passage that allows the ink chamber 111B to communicate with external air. The air communication portion 155 is provided at a position higher in the up-down direction 7 than the inlet 112B. The air communication portion 155 has one end that communicates with the ink chamber 111B through a notch 156 formed in a bottom wall of the air communication portion 155, and the other end that communicates with an exterior of the tank 100B through a through-hole 157 penetrating the top wall 103. A labyrinth channel, a semipermeable membrane, or the like may be provided inside the air communication portion 155.

<Residual Ink Sensor 73>

Figure 5:
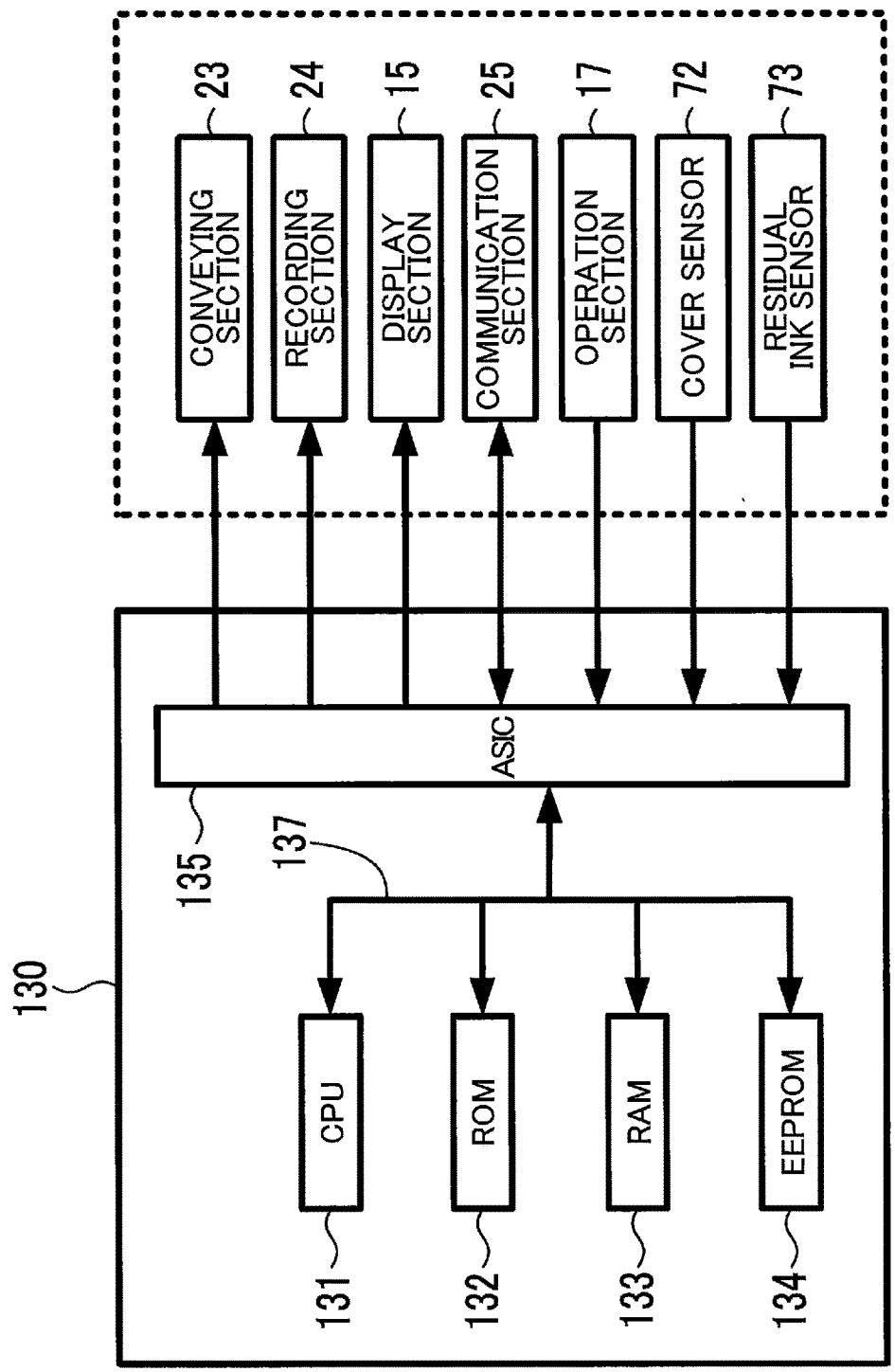
FIG. 5 is a functional block diagram of the MFP 10 according to the embodiment.

As illustrated in FIGS. 4 and 5, the MFP 10 also includes a residual ink sensor 73. The residual ink sensor 73 has the light-emitting portion 74 and a light-receiving portion 75. The light-emitting portion 74 and the light-receiving portion 75 are disposed on opposite sides of the ink detection portion 152 so as to face each other in the left-right direction 9. The light-emitting portion 74 is configured to output light (visible light or infrared light, for example) toward the light-receiving portion 75. The light can pass through walls constituting the ink detection portion 152 but not through black ink. The light-receiving portion 75 is configured to output a residual ink signal to the controller 130 based on whether the light-receiving portion 75 has received light outputted from the light-emitting portion 74 after the light passes through the ink detection portion 152. In other words, the residual ink sensor 73 is configured to output a residual ink signal to the controller 130 corresponding to the quantity of ink stored in the ink chamber 111B.

The residual ink sensor 73 according to the present embodiment is configured to output either a first residual ink signal or a second residual ink signal to the controller 130. The residual ink sensor 73 outputs the first residual ink signal in response to presence of ink at the detection position in the ink detection portion 152. On the other hand, the residual ink sensor 73 outputs the second residual ink signal in response to non-presence of ink at the detection position in the ink detection portion 152. In the present embodiment, the first residual ink signal outputted from the residual ink sensor 73 has a signal level of 0 V, while the second residual ink signal outputted from the residual ink sensor 73 has a signal level of 3.3 V. Hence, the phrase "the residual ink sensor 73 outputs a residual ink signal" includes cases in which the signal level is 0 V. However, combination of signal levels is not limited to the above example. Combination of position signals of a cover sensor 72 (described later) is also not limited to the example in the present embodiment.

The detection position is a position within the interior space of the ink detection portion 152 having a height in the up-down direction 7 the same as those of the light-emitting portion 74 and the light-receiving portion 75. The detection position in the up-down direction 7 is lower than the second line 147 and slightly higher than the interior space of the ink supply portion 151 when the MFP 10 is in its operable posture. Hence, the interior space of the ink supply portion 151 is filled with ink when the level of ink in the ink chamber 111B is aligned with the detection position. However, when the level of ink in the ink chamber 111B drops below the detection position, air introduced into the ink chamber 111B through the air communication portion 155 may enter the interior space of the ink supply portion 151. A difference in the up-down direction 7 between the detection position and the interior space in the ink supply portion 151 is preliminarily set based on an estimated quantity of ink required for recording an image on one sheet, for example.

Hence, the residual ink signal outputted from the residual ink sensor 73 switches from the first residual ink signal to the second residual ink signal at a timing in which the level of ink in the ink chamber 111B drops below the detection position. In the following description, a state of the ink chamber 111B when the residual ink sensor 73 outputs the second residual ink signal will be referred to as a "hard-empty" state. In other words, the term "hard-empty state" indicates a state of the ink chamber 111B just prior to air entering the interior space of the ink supply portion 151, for example. "Hard-empty" is an example of the quantity of ink stored in the ink chamber 111B being less than a residual ink threshold. The residual ink threshold corresponds to the quantity of ink stored in the ink chamber 111B when the level of ink in the ink chamber 111B is at the detection position, for example.

The tanks 100Y, 100C, and 100M may have a basic structure the same as that of the tank 100B. However, the tanks 100Y, 100C, and 100M are not provided with the ink detection portion 152. That is, the controller 130 cannot detect residual ink quantities in the corresponding ink chambers 111Y, 111C, and 111M using residual ink sensors 73. Hereinafter, the ink chambers 111B, 111Y, 111C, and 111M will be collectively referred to as the "ink chambers 111," the inlets 112B, 112Y, 112C, and 112M will be collectively referred to as the "inlets 112," and the caps 113B, 113Y, 113C, and 113M will be collectively referred to as the "caps 113."

<Cover 70>

As illustrated in FIG. 1B, an opening 22 is formed in the front surface of the casing 14 at a right end thereof. The front surface of the ink tank 100 is exposed to an outside of the MFP 10 through the opening 22. The MFP 10 has a cover 70 that is pivotally movable between a covering position (a position illustrated in FIG. 1A) for covering the opening 22, and an exposing position (a position illustrated in FIG. 1B) for exposing the opening 22. The cover 70 is supported to the casing 14 at a bottom edge portion of the casing 14 so as to be pivotally movable about a pivot axis extending along the left-right direction 9.

In the covering position, the cover 70 covers all of the inlets 112B, 112Y, 112C, and 112M and restricts injection of ink into all of the ink chambers 111B, 111Y, 111C, and 111M through the inlets 112B, 112Y, 112C, and 112M. Here, the cover 70 in the covering position may be configured to cover the inlets 112 in their entirety or to cover just a portion of the inlets 112. When the cover 70 is in the exposing position, all of the inlets 112B, 112Y, 112C, and 112M are exposed outside the MFP 10, allowing ink to be injected into all of the ink chambers 111B, 111Y, 111C, and 111M.

The user performs the following series of steps for filling the ink chambers 111 with ink. First, the user moves the cover 70 from the covering position to the exposing position and removes the cap 113 from the inlet 112 corresponding to the color of ink to be refilled. Next, the user inserts a tip of the ink bottle into the opened inlet 112 and injects all of ink in the ink bottle into the ink chamber 111. After the ink chamber 111 has been refilled, the user reattaches the cap 113 to the corresponding inlet 112 and moves the cover 70 back to the covering position.

The cover 70 has a transparent window 71. The transparent window 71 confronts the front walls 101 of the tanks 100B, 100Y, 100C, and 100M when the cover 70 is in the covering position. With this configuration, the user can visually recognize the residual ink quantity of ink in the ink chambers 111 through the front walls 101, regardless of whether the cover 70 is in the covering position or the exposing position. On the other hand, the transparent window 71 may be omitted from the cover 70. In this case, the user must move the cover 70 to the exposing position in order to check the levels of ink in the ink chambers 111.

<Cover Sensor 72>

As illustrated in FIG. 5, the MFP 10 also includes a cover sensor 72. The cover sensor 72 may be a mechanical sensor, such as a switch that the cover 70 contacts and separates from, or an optical sensor for emitting light that is transmitted or interrupted depending on the position of the cover 70, for example. The cover sensor 72 is configured to output, to the controller 130, a position signal corresponding to the position of the cover 70.

The cover sensor 72 is configured to output either a first position signal or a second position signal to the controller 130. The first position signal outputted from the cover sensor 72 indicates that the cover 70 is in the covering position. The second position signal outputted from the cover sensor 72 indicates that the cover 70 is in a position other than the covering position (the exposing position, for example). In the present embodiment, the first position signal outputted from the cover sensor 72 has a signal level of 0 V, and the second position signal outputted from the cover sensor 72 has a signal level of 3.3. V. In the following description, an expression "cover open event" will be used to indicate that the position signal outputted from the cover sensor 72 has changed from the first position signal to the second position signal, while an expression "cover close event" will be used to indicate that the position signal outputted from the cover sensor 72 has changed from the second position signal to the first position signal.

<Display Section 15>

As illustrated in FIGS. 1A, 1B and 5, the MFP 10 also includes a display section 15. The display section 15 displays information for the user in the form of messages. While there are no particular limitations on the specific structure of the display section 15, a liquid crystal display or an organic electro-luminescence display may be employed as the display section 15, for example. The display section 15 is an example of a display.

The display section 15 according to the present embodiment has a rectangular shape with 8 dots vertically by 80 dots horizontally. Thus, the display section 15 can display a maximum of 16 characters (including spaces), each comprising 8 dots vertically by 5 dots horizontally (approximately 8 mm vertically by approximately 5 mm horizontally). Further, when attempting to display a character string exceeding 16 characters on the display section 15, the character string is displayed in a scrolling format. When attempting to display character strings in a plurality of lines on the display section 15, the character string for each line is displayed in sequence. However, the size of the display section 15 is not limited to the above example.

<Operation Section 17>

The MFP 10 also includes an operation section 17 for receiving user operations. The operation section 17 is an input interface that accepts input from a user indicating instructions for the MFP 10. The operation section 17 according to the present embodiment is configured of a plurality of push buttons, including numeric keypad 17A and an OK button 17B. However, the push buttons provided in the operation section 17 are not limited to the above example, and may include directional keys corresponding to "up", "down", "right", and "left". Further, the specific configuration of the operation section 17 is not limited to the push buttons, but may be a touchscreen superimposed over the display screen of the display section 15. The operation section 17 is an example of an operation interface.

The operation section 17 is configured to output, to the controller 130, operation signals corresponding to the push buttons that is pressed. Specifically, the operation section 17 according to the present embodiment is configured to output a first operation signal, a second operation signal, and a third operation signal to the controller 130. The operation section 17 outputs the first operation signal to the controller 130 when the [1] button in the numeric keypad 17A is pressed (first operation). The operation section 17 outputs the second operation signal to the controller 130 when the [2] button in the numeric keypad 17A is pressed (second operation). The operation section 17 outputs the third operation signal to the controller 130 when the OK button 17B is pressed (third operation, fourth operation). The operation section 17 also outputs, to the controller 130, other operation signals corresponding to other buttons when the other buttons are pressed.

In the following description, an expression "the [1] button is pressed" will indicate that the operation section 17 outputs the first operation signal, an expression "the [2] button is pressed" will indicate that the operation section 17 outputs the second operation signal, and an expression "the OK button 17B is pressed" will indicate that the operation section 17 outputs the third operation signal. Note that the buttons corresponding to the first operation signal, the second operation signal, and the third operation signal are not limited to the above example. The third operation and the fourth operation are not differentiated in the present embodiment since both operations are assigned to the OK button 17B, but the fourth operation may instead be assigned to a button other than the OK button 17B.

<Communication Section 25>

As illustrated in FIG. 5, the MFP 10 also includes a communication section 25. The communication section 25 is an interface through which the MFP 10 communicates with external devices. In other words, the MFP 10 is configured to transmit various data to external devices through the communication section 25 and to receive various data from external devices through the communication section 25. The communication section 25 may also function as a facsimile receiving section that receives facsimile data from external devices.

<Controller 130>

As illustrated in FIG. 5, the controller 130 includes a central processing unit (CPU) 131, a read-only memory (ROM) 132, a random-access memory (RAM) 133, an electrically erasable programmable ROM (EEPROM) 134, and an application-specific integrated circuit (ASIC) 135. The CPU 131, the ROM 132, the RAM 133, the EEPROM 134, and the ASIC 135 are interconnected with one another via an internal bus 137. The ROM 132 stores programs and the like with which the CPU 131 controls various operations. The RAM 133 is used as a storage area for temporarily storing data, signals, and the like used when the CPU 131 executes the above programs, or as a work area for data processes. The EEPROM 134 stores settings, flags, and the like that must be preserved even during the plug OFF state. The ROM 132, the RAM 133, and the EEPROM 134 are examples of a memory. The controller 130 also includes an internal clock (otherwise known as a hardware clock) that outputs time information.

The EEPROM 134 stores a count value for each of the ink chambers 111B, 111Y, 111C, and 111M. The count value in the present embodiment is set to an initial value (0, for example) in S28 or S33 (described later) and is incremented in S46 (described later) based on the quantity of ink ejected from the recording section 24. In the following description, the count value for the ink chamber 111B will be referred to as the "count value B," the count value for the ink chamber 111Y will be referred to as the "count value Y," the count value for the ink chamber 111C will be referred to as the "count value C," and the count value for the ink chamber 111M will be referred to as the "count value M."

The EEPROM 134 also stores a first threshold value and a second threshold value for each of the ink chambers 111B, 111Y, 111C, and 111M. The first threshold value is set to a slightly smaller value (95, for example) than the maximum storage quantity (100, for example) of ink that can be stored in the corresponding ink chamber 111, for example. A difference between the maximum storage quantity and the first threshold value for the ink chamber 111B is equivalent to the residual ink threshold, for example. The second threshold value is set to a value (85, for example) closer to the initial value of the count value than the first threshold value is to the initial value. A difference between the maximum storage quantity and the second threshold value is equivalent to the quantity of ink stored in the corresponding ink chamber 111 when the level of ink in the ink chamber 111 is aligned with the second line 147, for example.

In the following description, a state of the ink chamber 111 when the difference between the first threshold value and the corresponding count value (first threshold value−count value) is less than 0 will be referred to as a "soft-empty" state. Further, a state of the ink chamber 111 when the difference between the second threshold value and the corresponding count value (second threshold value−count value) is less than 0 will be referred to as an "ink low" state. Hence, the ink chamber 111 arrives at the ink low state prior to the soft-empty state. Ideally or theoretically, a timing at which the ink chamber 111 reaches the soft-empty state is equivalent to a timing at which the ink chamber 111 reaches the hard-empty state. The difference between the first threshold value and the count value and the difference between the second threshold value and the count value may be used as estimation values of the quantity of ink remaining in the corresponding ink chamber 111. "Soft-empty" is an example of the quantity of ink stored in the ink chamber 111 being less than the residual ink threshold.

Note that the count value, the first threshold value, and the second threshold value are not limited to the relationships described above. As an alternative example, the count value may be set to an initial value (100, for example) in S28 or S33, and may be decremented in S46 based on the quantity of ink ejected from the recording section 24. Here, the first threshold value may be set to a smaller value (5, for example) than the second threshold value (15, for example). In this variation, the soft-empty state is determined based on (count value−first threshold value), and the ink low state is determined based on (count value−second threshold value).

In other words, the count value should be updated in S46 in a direction approaching the first threshold value. Here, the expression "a direction approaching the first threshold value" represents the relationship between the count value and the first threshold value when the count value has been set to its initial value. That is, an incremented count value is continuously incremented, even after reaching the first threshold value. Similarly, a decremented count value is continuously decremented, even after reaching the first threshold value. Further, the second threshold value should be set to a value at which its difference with the count value reaches 0 (zero) before the difference between the count value and the first threshold value reaches 0 (zero).

Note that the difference between the first threshold value and the corresponding count value is obtained by subtracting one of the first threshold value and the count value from the other of the first threshold value and the count value. Further, the difference between the second threshold value and the corresponding count value is obtained by subtracting one of the second threshold value and the count value from the other of the second threshold value and the count value. In a case where the difference between the first threshold value and the correspond count value is obtained by subtracting the first threshold value from the count value, the difference between the second threshold value and the corresponding count value should be obtained by subtracting the second threshold value from the count value. In a case where the difference between the first threshold value and the corresponding count value is obtained by subtracting the count value from the first threshold value, the difference between the second threshold value and the corresponding count value should be obtained by subtracting the count value from the second threshold value.

Figure 7:
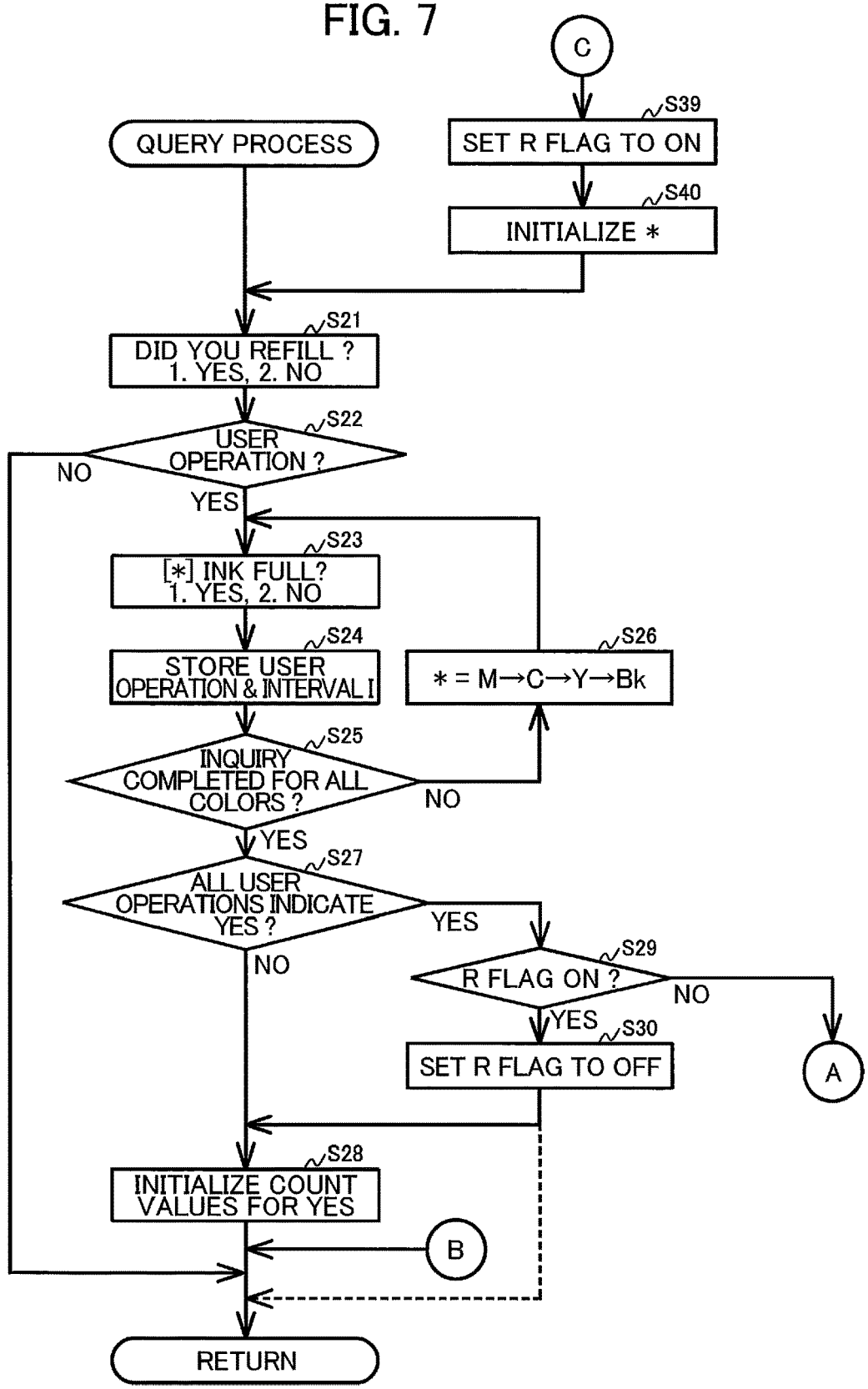
FIG. 7 is a flowchart illustrating steps in a query process performed by the controller 130 according to the embodiment.
Figure 8:
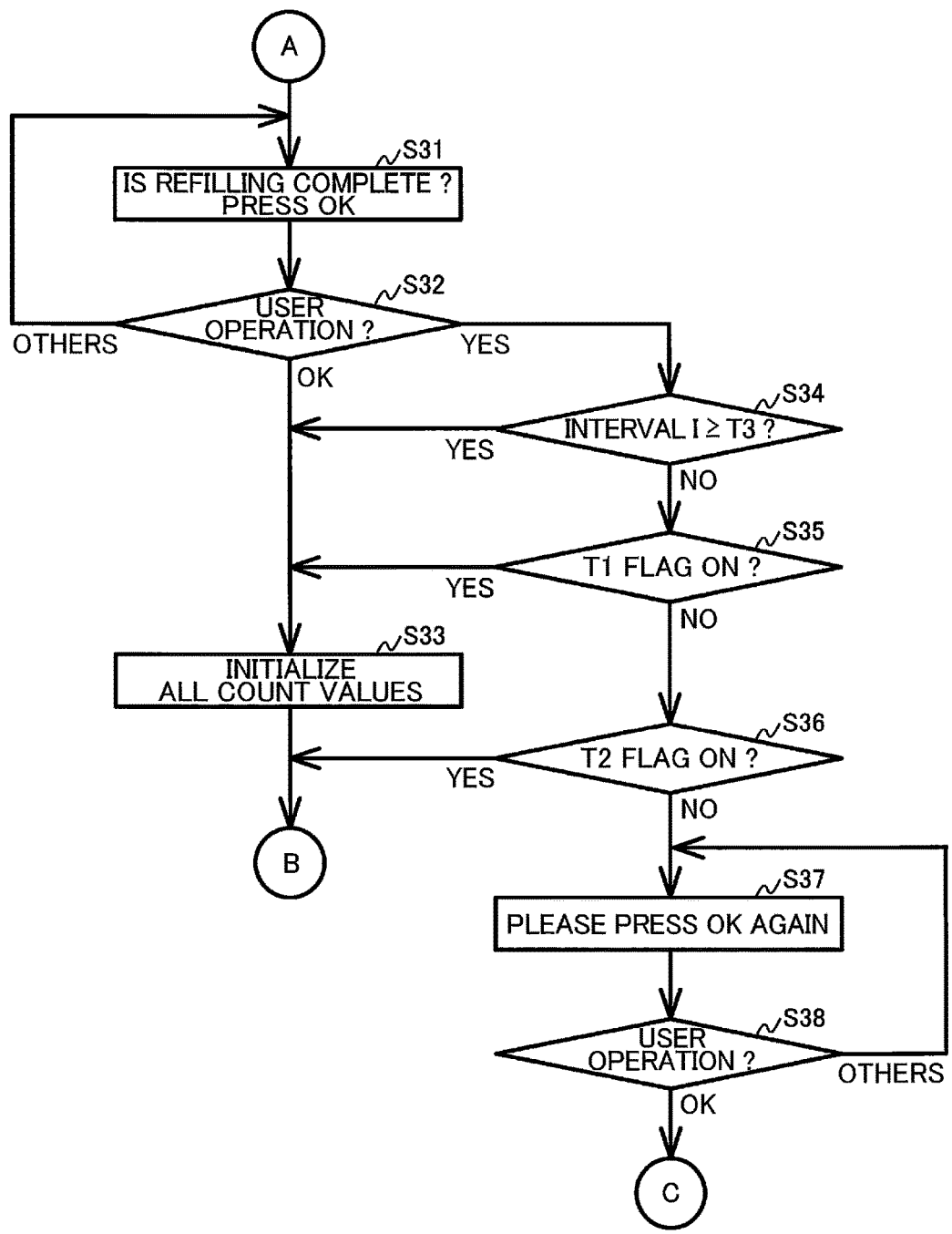
FIG. 8 is a flowchart illustrating steps in the query process performed by the controller 130 according to the embodiment.

The EEPROM 134 also stores a re-inquiry flag ("R FLAG" in the flowchart of FIG. 7). The re-inquiry flag indicates whether the user has been already queried about refilling the ink chambers 111. The re-inquiry flag is set to either "ON" (first value) indicating that the user has been queried about whether the ink chambers 111 have been refilled, or "OFF" (second value) indicating that the user has not been queried about whether the ink chambers 111 have been refilled. The initial value of the re-inquiry flag is "OFF". The re-inquiry flag may be stored in the RAM 133.

The EEPROM 134 also stores operation signals based on user operations performed in response to inquiries about whether the ink chambers 111 have been refilled. Since an inquiry is performed for each color of ink, the EEPROM 134 stores an operation signal inputted through the operation section 17 in response to an inquiry for each ink color. These operation signals may be stored in the RAM 133.

The EEPROM 134 also stores a T1 flag and a T2 flag. The T1 flag indicates whether the duration of time during which the cover 70 has been open is longer than or equal to a first time period T1. The T1 flag is set to either "ON" (first value) indicating that the cover-open duration is longer than or equal to the first time period T1, or "OFF" (second value) indicating that the cover-open duration is shorter than the first time period T1. The T2 flag indicates whether the duration of time during which the cover 70 has been open is shorter than or equal to a second time period T2. The T2 flag is set to either "ON" (first value) indicating that the cover-open duration is shorter than or equal to the second time period T2, or "OFF" (second value) indicating that the cover-open duration is longer than the second time period T2. The initial values of the T1 flag and the T2 flag are both "OFF". The first time period T1 and the second time period T2 are stored in the EEPROM 134. The T1 flag and the T2 flag may be stored in the RAM 133.

Further, the conveying section 23, the recording section 24, the display section 15, the communication section 25, the operation section 17, the cover sensor 72, and the residual ink sensor 73 are connected to the ASIC 135. The controller 130 controls the conveying section 23 to convey sheets, controls the recording section 24 to eject ink, controls the display section 15 to display screens, and controls the communication section 25 to communicate with external devices. Further, the controller 130 acquires operation signals from the operation section 17, acquires position signals from the cover sensor 72, and acquires residual ink signals from the residual ink sensor 73. As an example, the controller 130 may read the position signal outputted from the cover sensor 72 and the residual ink signal outputted from the residual ink sensor 73 at prescribed time intervals (every 50 msec, for example).

<Operations of MFP10>

Next, operations of the MFP 10 according to the present embodiment will be described with reference to FIGS. 6 through 9. The CPU 131 of the controller 130 performs all processes described in FIGS. 6 through 9. Note that, to implement the following processes, the CPU 131 may read and execute a program stored in the ROM 132. Alternatively, the following processes may be implemented by hardware circuits mounted in the controller 130.

<Cover Open Process>

Figure 6:
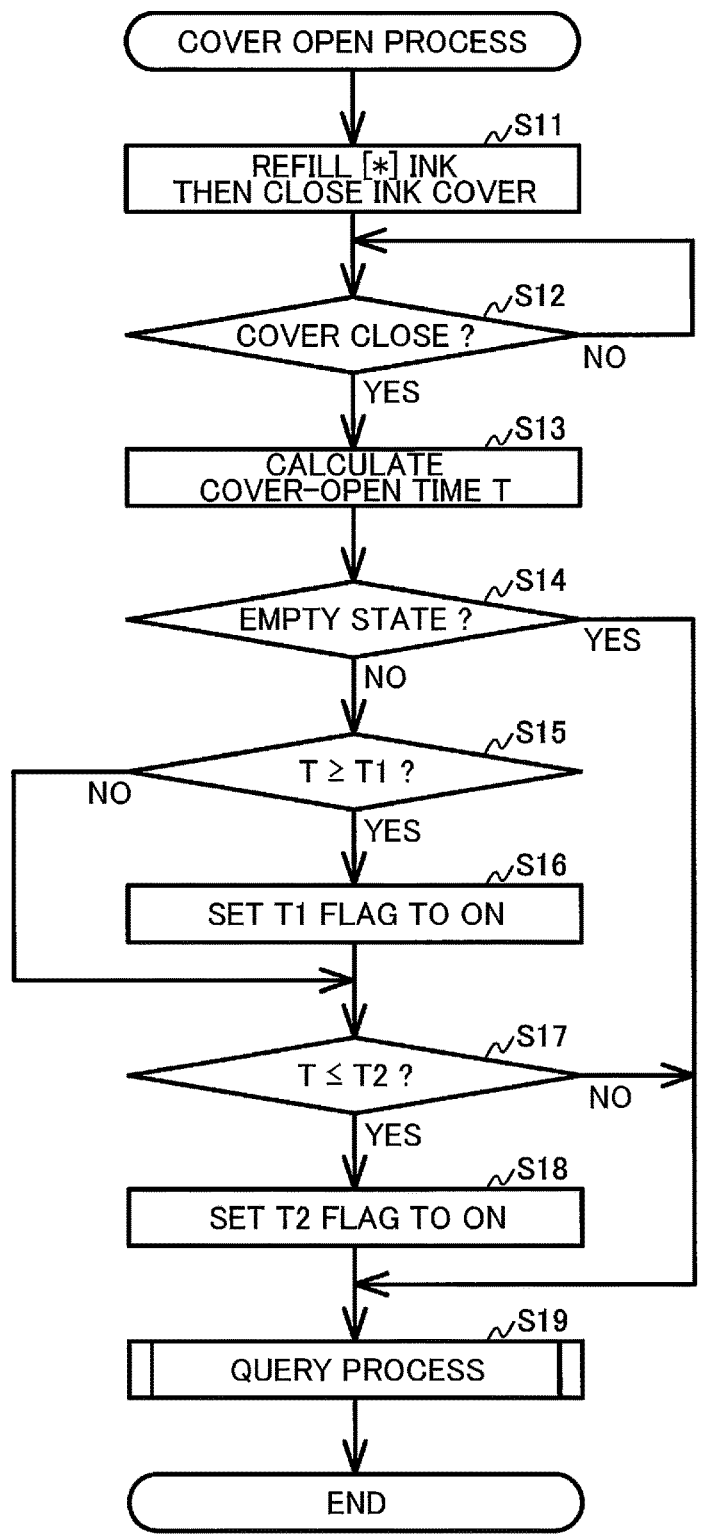
FIG. 6 is a flowchart illustrating steps in a cover open process performed by a controller 130 of the MFP 10 according to the embodiment.

First, the controller 130 detects the cover open event through the cover sensor 72 and performs a cover open process illustrated in FIG. 6 in response to the detection of the cover open event through the cover sensor 72. The controller 130 performs the cover open process in response to the movement of the cover 70 from its covering position to its exposing position while the MFP 10 is in a standby state (a state in which the MFP 10 is not performing an image recording process described later), for example. The cover open process is performed to prompt the user to refill an ink chamber 111 with ink and to confirm with the user that the ink chamber 111 has been refilled.

In S11 at the beginning of the cover open process in FIG. 6, the controller 130 controls the display section 15 to display a refill notification screen on the display section 15. A character string "REFILL [*] INK" and a character string "THEN CLOSE INK COVER" are alternately displayed in the refill notification screen, for example. Here, "[*]" is replaced with characters representing the colors of ink (Bk, Y, C, and M). The controller 130 may include, in the refill notification screen, characters representing the colors of ink stored in ink chambers 111 in the ink low state. The controller 130 controls the display section 15 to continuously display the refill notification screen on the display section 15 until the controller 130 detects the cover close event through the cover sensor 72 (S12: NO). In addition, the controller 130 acquires, from the internal clock, first time information indicative of time that the cover open event is detected, and stores this first time information in the RAM 133.

When viewing the refill notification screen, the user removes the cap 113 from the inlet 112 of the ink chamber 111 to be refilled and injects ink into the ink chamber 111. After refilling the ink chamber 111, the user closes the inlet 112 with the cap 113 and moves the cover 70 back to the covering position. At this time, the user may refill ink of only those colors indicated in the refill notification screen, may refill ink of all colors, or may not refill ink of any color. However, the controller 130 cannot detect what colors of ink have been replenished.

In response to the detection of the cover close event through the cover sensor 72 (S12: YES), in S13 the controller 130 calculates a cover-open time T. The cover-open time T is a time interval during which the cover 70 has been in the exposing position. In other words, the cover-open time T is a time during which the cover sensor 72 has continuously outputted the second position signal. To calculate the cover-open time T, the controller 130 acquires, from the internal clock, second time information indicative of time that the cover close event is detected and subtracts the time indicated by the second time information from the time indicated by the first time information, for example.

Next, in S14 the controller 130 determines whether any of the ink chambers 111 is in an empty state. Here, "empty" implies "hard-empty" or "soft-empty". Thus, in the present embodiment, the "empty state" implies the hard-empty state for the ink chamber 111B or the soft-empty state for the ink chambers 111Y, 111C, and 111M. Specifically, in S14, the controller 130 determines whether at least one of the three ink chambers 111Y, 111C, and 111M is in the soft-empty state or if the ink chamber 111B is in the hard-empty state (S14: YES) or if none of the ink chambers 111B, 111Y, 111C, and 111M is in the empty state (S14: NO).

In response to the determination that none of the ink chambers 111B, 111Y, 111C, and 111M is in the empty state (S14: NO), in S15 the controller 130 determines whether the cover-open time T calculated in S13 is greater than or equal to the first time period T1. The process in S15 is an example of a first duration determination process. The first time period T1 is a preset time thought to be necessary for a typical user to inject ink into all the ink chambers 111. In response to the determination that the cover-open time T is greater than or equal to the first time period T1 (S15: YES), in S16 the controller 130 sets the T1 flag to "ON".

After setting the T1 flag to "ON" in S16 or in response to the determination in S15 that the cover-open time T is less than the first time period T1 (S15: NO), in S17 the controller 130 determines whether the cover-open time T calculated in S13 is less than or equal to the second time period T2. The process in S17 is an example of a second duration determination process. The second time period T2 is a preset time thought to be too short for a typical user to inject ink into an ink chamber 111. Generally, the second time period T2 is shorter than the first time period T1 (T1>T2). In response to the determination in S17 that the cover-open time T is less than or equal to the second time period T2 (S17: YES), in S18 the controller 130 sets the T2 flag to "ON".

After setting the T2 flag to "ON" in S18 or in response to the determination in S17 that the cover-open time T is greater than the second time period T2 (S17: NO), in S19 the controller 130 performs a query process described later. The controller 130 also performs the query process of S19 in response to the determination in S14 that at least one of the ink chambers 111 is in the empty state (S14: YES).

The query process is performed to prompt the user to confirm whether the ink chambers 111 have been refilled with ink and to initialize the corresponding count values based on the user's response. Next, the query process will be described in detail with reference to FIGS. 7 and 8.

<Query Process>

In S21 at the beginning of FIG. 7, the controller 130 controls the display section 15 to display a preliminary inquiry screen on the display section 15. The preliminary inquiry screen prompts the user to indicate whether at least one of the ink chambers 111 has been refilled. For example, a character string "DID YOU REFILL?" and a character string "1. YES, 2. NO" are alternately displayed in the preliminary inquiry screen. The controller 130 controls the display section 15 to continuously display the preliminary inquiry screen on the display section 15 until the controller 130 receives a first operation or a second operation through the operation section 17 (S22).

In the process of S21 and S22, the first operation is a user operation for indicating that at least one of the ink chambers 111 has been refilled with ink and corresponds to pressing the [1] button, for example. The second operation is a user operation for indicating that none of the ink chambers 111 has been refilled with ink and corresponds to pressing the [2] button, for example.

In response to the pressing of the [1] button while the preliminary inquiry screen is displayed (S22: YES), in S23 the controller 130 controls the display section 15 to display an inquiry screen on the display section 15 that targets each of the ink chambers 111 individually. This inquiry screen prompts the user to indicate whether the target ink chamber 111 has been refilled with ink up to its maximum storage quantity. For example, a character string "[*] INK FULL?" and a character string "1. YES, 2. NO" are alternately displayed in the inquiry screen. Here, "[*]" is replaced with characters representing the colors of ink corresponding to the ink chamber 111 targeted in the process S23 (Bk, Y, C, and M). The controller 130 controls the display section 15 to continuously display the inquiry screen on the display section 15 until the controller 130 receives a first operation or a second operation through the operation section 17.

In the process of S23 and S24, the first operation is a user operation for indicating that the target ink chamber 111 has been refilled with ink up to the level of its maximum storage quantity and corresponds to pressing the [1] button, for example. The second operation is a user operation either for indicating that the target ink chamber 111 has been refilled with ink but not up to the level of its maximum storage quantity in a case where, of the ink chambers 111, the target ink chamber 111 has been refilled and the [1] button is pressed in S22, or for indicating that the target ink chamber 111 has not been refilled in a case where the [1] button is pressed in S22 but any of the ink chambers 111 other than the target ink chamber 111 has been refilled. The second operation corresponds to pressing the [2] button, for example.

In S24 the controller 130 stores the operation signal received through the operation section 17 for the process in S23 in the RAM 133. Also in S24, the controller 130 stores a time interval (interval I) between reception timings of user operations received through the operation section 17 for the process in S23 in the RAM 133. The interval I may be an average time interval between the plurality of user operations, or a maximum or minimum time interval.

In S25 the controller 130 determines whether the process in S23 has been completed for all colors. While the process in S23 has not been performed for all colors (S25: NO), in S26 the controller 130 sets the character to be displayed in place of the "[*]" to the next character in the sequence M→C→Y→Bk, for example. In S23 the controller 130 controls the display section 15 to display the inquiry screen on the display section 15 targeting the ink chamber 111 of the next color in sequence. In this way, the process in S23-S26 is repeated for each of the ink chambers 111M, 111C, 111Y, and 111B. Accordingly, the interval I may be an average time interval, or a maximum or minimum time interval, among a time interval between a user operation received for the process in S23 that targets the ink chamber 111M and a user operation received for the process in S23 that targets the ink chamber 111C, a time interval between the user operation received for the process in S23 that targets the ink chamber 111C and a user operation received for the process in S23 that targets the ink chamber 111Y, and a time interval between the user operation received for the process in S23 that targets the ink chamber 111Y and a user operation received for the process in S23 that targets the ink chamber 111B, for example. The process in S23-S26 is an example of an inquiry process. The process in S23 is an example of a displaying and receiving process.

After the controller 130 has completed the process in S23 for all the ink chambers 111 (S25: YES), in S27 the controller 130 determines whether all the operation signals stored in the RAM 133 indicate the first operation. The process in S27 is an example of an operation determination process.

Here, a user wishing only to end the query process as quickly as possible may continue pressing the [1] button without carefully reading the message in the inquiry screen displayed on the display section 15, for example. Since the controller 130 cannot detect which ink chambers 111 have been refilled with ink, the controller 130 simply determines whether each of the ink chambers 111 has been refilled based on the user's input in the query process. If the user indicates an ink chamber 111 has been refilled despite not having actually refilled the ink chamber 111, the count value will be initialized even though the quantity of residual ink in the ink chamber 111 is low. Thus, when resetting the count values to their initial values based on such user input, the controller 130 may not be able to accurately notify the user when the ink chambers 111 enter the soft-empty state.

In response to the determination that any one of the operation signals stored in the RAM 133 is not the operation signal indicative of the first operation (S27: NO), in S28 the controller 130 initializes the count values of ink chambers 111 for which the [1] button has been pressed in S23 while not initializing the count values of ink chambers 111 for which the [2] button has been pressed in S23 based on the operation signals stored in the RAM 133. Subsequently, the controller 130 ends the query process.

On the other hand, in response to the determination that all the operation signals stored in the RAM 133 are the operation signal indicative of the first operation (S27: YES), in S29 the controller 130 determines whether the re-inquiry flag has been set to "ON". In response to the determination in S29 that the re-inquiry flag has been set to "ON" (S29: YES), in S30 the controller 130 sets the re-inquiry flag to "OFF", and then, in S28 initializes the count values for all the ink chambers 111. Subsequently the controller 130 ends the query process. The process in S29 is an example of a flag determination process.

In response to the determination in S29 that the re-inquiry flag has been set to "OFF" (S29: NO) after the determination in S27 that all the operation signals stored in the RAM 133 are the operation signal indicative of the first operation (S27: YES), in S31 of FIG. 8, the controller 130 controls the display section 15 to display a confirmation screen on the display section 15 prompting the user to press the OK button 17B to confirm that all the ink chambers 111 have been refilled with ink. The confirmation screen serves to reconfirm with the user whether all the ink chambers 111 have been refilled. For example, a character string "IS REFILLING COMPLETE? PRESS OK" is displayed in the confirmation screen. In other words, the user is prompted to perform a third operation different from the first operation. The controller 130 continues to display the confirmation screen on the display section 15 until the first operation or the third operation is received through the operation section 17 (S32: OTHERS). The process in S31 and S32 is an example of a confirmation process.

In response to the pressing of the OK button 17B, that is, in response to the receipt of the third operation (S32: OK), in S33 the controller 130 initializes the count values for all the ink chambers 111, and subsequently ends the query process.

In response to the pressing of the [1] button, that is, in response to the receipt of the first operation (S32: YES), in S34 the controller 130 determines whether the interval I stored in the RAM 133 is greater than or equal to a third time period T3. The third time period T3 is a preset time thought to be necessary for a typical user to input the first operation or the like after reading the message in the inquiry screen displayed on the display section 15. The process in S34 is an example of a reception interval determination process.

In response to the determination in S34 that the interval I stored in the RAM 133 is greater than or equal to the third time period T3 (S34: YES), in S33 the controller 130 initializes the count values for all the ink chambers 111, and subsequently ends the query process.

However, in response to the determination in S34 that the interval I is less than the third time period T3 (S34: NO), in S35 the controller 130 determines whether the T1 flag stored in the RAM 133 has been set to "ON". In response to the determination in S35 that the T1 flag has been set to "ON" (S35: YES), in S33 the controller 130 initializes the count values for all the ink chambers 111, and subsequently ends the query process.

However, in response to the determination in S35 that the T1 flag has been set to "OFF" (S35: NO), in S36 the controller 130 determines whether the T2 flag stored in the RAM 133 has been set to "ON". In response to the determination in S36 that the T2 flag has been set to "ON" (S36: YES), the controller 130 ends the query process without initializing the count values for any of the ink chambers 111.

However, in response to the determination in S36 that the T2 flag has been set to "OFF" (S36: NO), in S37 the controller 130 controls the display section 15 to display a warning screen on the display section 15 prompting the user again to press the OK button 17B, and receives a user operation. The warning screen prompts the user again to press the OK button 17B (i.e. input of the fourth operation) so that the query process can be performed again. For example, a character string "PLEASE PRESS OK AGAIN" is displayed in the warning screen. The controller 130 controls the display section 15 to continuously display the warning screen on the display section 15 until a fourth operation is received through the operation section 17 (S38: OTHERS). In other words, if the user presses the [1] button (the first operation) in this step, for example, the controller 130 will continue to display the warning screen on the display section 15. The process in S37 and S38 is an example of a warning process.

In response to the pressing of the OK button 17B (S38: OK), in S39 of FIG. 7, the controller 130 sets the re-inquiry flag to "ON". In S40 the controller 130 changes the character displayed in place of the "[*]" to represent the color of ink (Bk, Y, C, and M) to the initial value in the sequence, and repeats the query process described above from S21. The process in S39 is an example of a setting process.

Further, in response to the pressing of the [2] button while the preliminary inquiry screen is displayed (S22: NO), the controller 130 ends the query process without initializing the count values for all the ink chambers 111.

<Image Recording Process>

Next, an image recording process will be described with reference to FIG. 9. The controller 130 performs the image recording process based on a recording instruction that is inputted into the MFP 10. The recording instruction is an instruction to the MFP 10 to perform a recording process for recording images on sheets based on image data. While there is no particular limitation on the source for acquiring the recording instruction, the recording instruction may be acquired from the user through the operation section 17 or may be acquired from an external device through the communication section 25, for example. In addition, the recording instruction may instruct the MFP 10 to record images on sheets based on fax data.

Figure 9:
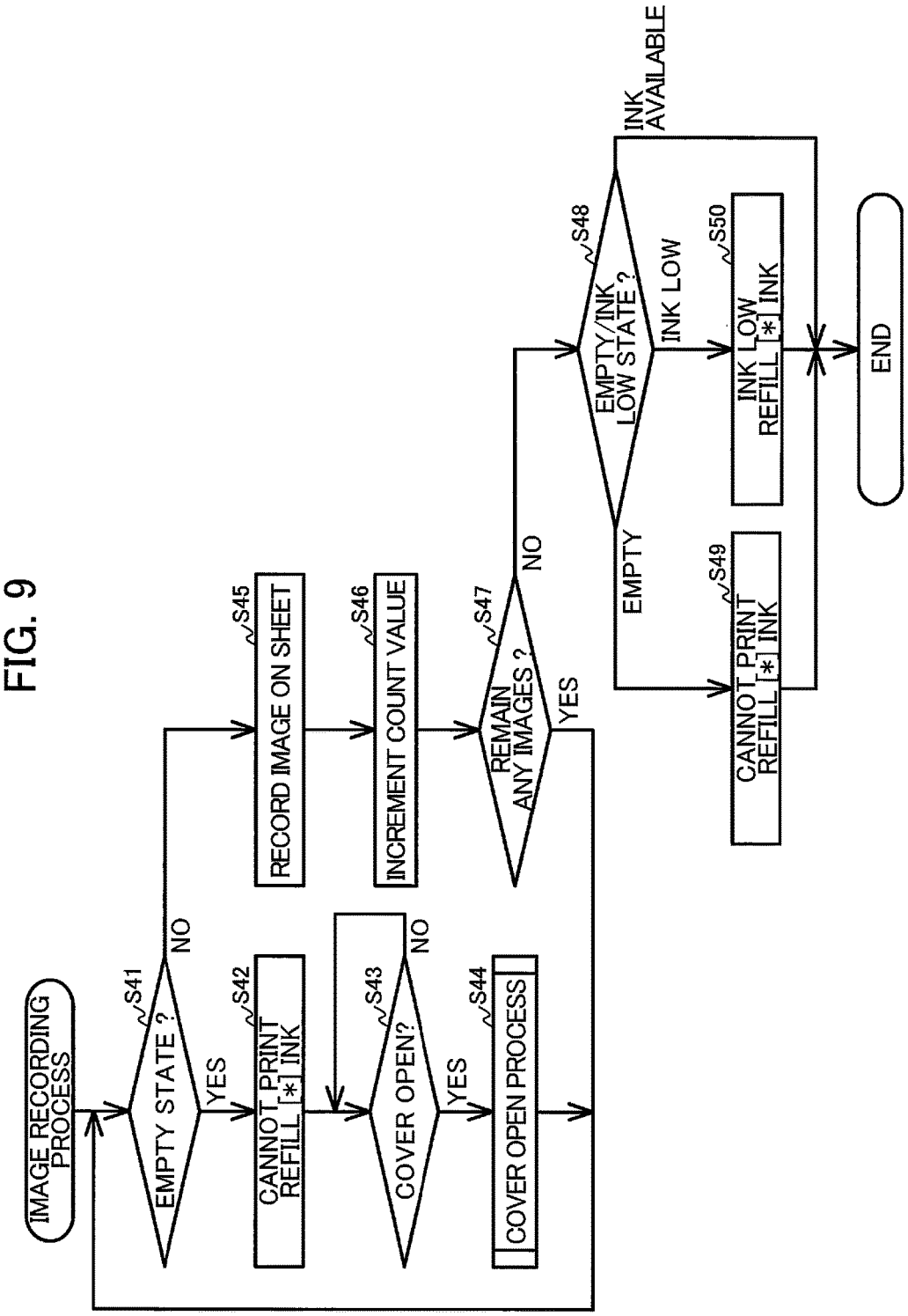
FIG. 9 is a flowchart illustrating steps in an image recording process performed by the controller 130 according to the embodiment.

In S41 at the beginning of the process in FIG. 9, the controller 130 determines whether any of the ink chambers 111 is the empty state. The process in S41 is an example of an empty determination process. In response to the determination that any one of the three ink chambers 111Y, 111C, and 111M is in the soft-empty state or that the ink chamber 111B is in the hard-empty state (S41: YES), in S42 the controller 130 controls the display section 15 to display an empty notification screen on the display section 15. The empty notification screen is an example of a notification screen for notifying the user that the recording process cannot be performed until ink has been refilled. The process in S42 is an example of a notification process.

More specifically, a character string "CANNOT PRINT" and a character string "REFILL [*] INK" are alternately displayed in the empty notification screen. Here, "[*]" is replaced with characters representing the colors of ink stored in ink chambers 111 in the empty state (i.e. soft-empty state or hard-empty state). The controller 130 controls the display section 15 to continuously display the empty notification screen on the display section 15 until the controller 130 detects the cover open event through the cover sensor 72 (S43: NO). In response to the detection of the cover open event through the cover sensor 72 (S43: YES), in S44 the controller 130 performs the cover open process. After completing the cover open process, the controller 130 repeats the process from S41.

When any one of the four ink chambers 111 is still in the empty state after the cover open process is performed (S41: YES), the controller 130 repeats the process from S42 described above.

However, in response to the determination that none of the ink chambers 111 is in the empty state (S41: NO), in S45 the controller 130 records images on sheets based on image data included in the record instruction. The process in S45 is an example of a recording process. Thus, the recording unit 24 can eject ink when none of the ink chambers 111 is in the empty state, but cannot eject ink when even one of the ink chambers 111 is in the empty state.

More specifically, in S45 the controller 130 controls the conveying section 23 to convey a sheet supported in the feed tray 20 to a position confronting the recording section 24. Next, the controller 130 controls the recording section 24 to eject ink toward the sheet confronting the recording section 24 to record an image on the sheet. Subsequently, the controller 130 controls the conveying section 23 to discharge the sheet having an image recorded by the recording section 24 into the discharge tray 21.

In addition, in S46 the controller 130 counts the quantity of ink ejected from the recording section 24 in S45 for each color and increments the corresponding count value. The process in S46 is an example of an updating process. Note that the timing for incrementing the count values is not limited to the timing of S46. Any time ink is ejected from the recording section 24, the controller 130 increments the corresponding count values based on the quantities of ink ejected from the recording unit 24, such as in a flushing process in which the recording section 24 ejects ink toward an ink receptor (not illustrated) or a purging process in which a pump or the like (not illustrated) forcibly discharges ink from the recording section 24.

In S47 the controller 130 determines whether there remain any images indicated in the record instruction that have not been recorded on sheets. Until the controller 130 records all images indicated in the record instruction on sheets (S47: YES), the controller 130 returns to S41 and repeats the process in S41-S46 described above. After all images indicated in the record instruction have been recorded on sheets (S47: NO), in S48 the controller 130 compares the count values for the three ink chambers 111Y, 111C, and 111M to their corresponding first and second threshold values and the count value for the ink chamber 111B to its corresponding second threshold value. In S48, the controller 130 further determines whether the residual ink signal outputted from the residual ink sensor 73 at this time indicates the hard-empty state.

In response to the determination that any one of the ink chambers 111Y, 111C, and 111M is in the soft-empty state or that the ink chamber 111B is in the hard-empty state (S48: EMPTY), in S49 the controller 130 controls the display section 15 to display the empty notification screen on the display section 15. Further, in response to the determination that none of the ink chambers 111 is in the empty state but any one of the ink chambers 111 is in the ink low state (S48: INK LOW), in S50 the controller 130 controls the display section 15 to display an ink low notification screen on the display section 15. On the other hand, if none of the ink chambers 111 is in the ink low state or the empty state (S48: INK AVAILABLE), the controller 130 ends the image-recording process without performing any of the process in S49 or S50.

The empty notification screen displayed in S49 may be identical to that displayed in S42. The ink low notification screen is a notification screen for notifying the user that the ink chamber 111 is approaching the empty state. Specifically, a character string "INK LOW" and a character string "REFILL [*] INK" are alternately displayed in the ink low notification screen. Here, "[*]" is replaced with the characters representing the colors of ink stored in ink chambers 111 in the ink low state.

The controller 130 controls the display section 15 to continuously display the empty notification screen or the ink low notification screen on the display section 15 until one of the following events occurs: the cover open event is detected through the cover sensor 72, the record instruction is inputted, or the operation section 17 is operated.

<Operational Advantages>

In the present embodiment described above, even if the user repeatedly inputs the first operation (pressing of the [1] button) in the operation section 17 during the query process without reading the message in the inquiry screen displayed on the display section 15, the controller 130 will not initialize the count values until input of the third operation (pressing of the OK button) is received in the confirmation screen. Thus, the controller 130 can force the user to confirm the message in the confirmation screen.

If the operation section 17 repeatedly receives the first operation (pressing of the [1] button) in the query process and further receives the first operation in the confirmation process of S31 (S32: YES), the controller 130 displays the warning screen on the display section 15 (S37). The controller 130 does not return to the query process until the user inputs a fourth operation (pressing of the OK button) different from the first operation while the warning screen is displayed. Accordingly, the controller 130 dependably displays the warning screen in response to the user inputting the first operation repeatedly.

In the present embodiment, the controller 130 displays the inquiry screen when the user operates the cover 70 to open and close the cover 70.

Further, it is likely that the user has refilled at least one of the ink chambers 111 with ink if the duration of time from when the cover 70 is open until when the cover 70 is closed is greater than or equal to the first time period T1. Thus, the controller 130 initializes the count values when subsequently receiving the first operation (pressing of the [1] button) repeatedly during the query process. Thus, this method coordinates the count values with the states of the ink chambers 111 to improve user convenience.

It is unlikely that the user has refilled an ink chamber 111 with ink if the duration of time from when the cover 70 is open until when the cover 70 is closed is less than or equal to the second time period T2. Thus, the controller 130 ends the query process without initializing the count values when subsequently receiving the first operation (pressing of the [1] button) repeatedly during the query process. This method reduces the likelihood of the count values being initialized despite the ink chambers 111 not being refilled.

It is also more likely that the user reviewed the message in the inquiry screen displayed on the display section 15 prior to inputting the first operation when the interval I between the user operations received in the query process is greater than or equal to the third time period T3. Hence, the controller 130 can initialize the count values based on user input, thereby enhancing user convenience.

The user is also more likely to review the message in the inquiry screen displayed on the display section 15 prior to inputting the first operation when the query process is repeated. Hence, the controller 130 can initialize the count values based simply on the user inputting the first operation in the repeated query process, thereby enhancing user convenience.

Since the controller 130 does not initialize the count values if the user repeatedly inputs the first operation on the operation section 17 without reading the message in the inquiry screen displayed on the display section 15 in the query process, the count values are not initialized for ink chambers 111 that have not been refilled. This process reduces the possibility of the ink chambers 111 running out of ink prior to the controller 130 determining they are in the empty state, thereby reducing the likelihood of the controller 130 performing the recording process while the ink chambers 111 are in the empty state and allowing air in the ink chambers 111 to enter the recording section 24.

<Modifications>

In the embodiment described above, the controller 130 initializes all the count values in the repeated query process when the user simply inputs the first operation in the repeated query process. However, the controller 130 may be configured to end the query process without initializing the count values when the user only inputs the first operation in the repeated query process, as indicated by a dashed arrow in FIG. 7.

In other words, it is possible that the user may again repeatedly input the first operation in the repeated query process without reading the message in the inquiry screen displayed on the display section 15. Thus, there is a low probability that such a user will confirm the display on the display section 15, even when the query process is repeated. Therefore, if only the first operation is inputted in the repeated query process, the controller 130 ends the process without initializing the count values.

Further, while the third and fourth operations are assigned to the same OK button 17B in the embodiment described above, these operations may be assigned to different buttons instead.

The first time period T1 in S15 may be adjusted (i.e. increased or decreased) based on whether the ink chamber 111 is in the ink low state. In other words, the first time period T1 may be set longer for an ink chamber 111 in the ink low state than for an ink chamber 111 that is not in the ink low state. More specifically, the first time period T1 may be set to a longer time interval when the number of ink chambers 111 in the ink low state is greater.

By adjusting the first time period T1 based on the difference between the second threshold value and the count value in this way, the controller 130 can determine more appropriately whether to initialize the count values. For example, the probability of the user refilling the ink chamber 111 with ink is higher when the difference between the second threshold value and the corresponding count value is smaller, and lower when the difference between the second threshold value and the corresponding count value is greater. Hence, the controller 130 can avoid unnecessary initialization of the count values by increasing the first time period T1 when the difference between the second threshold value and the count value is smaller.

It is also possible that the user will refill multiple ink chambers 111 with ink after moving the cover 70 to the exposing position. In such cases, the length of time required to refill the ink chambers 111 with ink is likely greater when the number of ink chambers 111 in an ink low state is greater. Hence, adjusting the first time period T1 based on the number of ink chambers 111 in the ink low state will improve the precision for inferring whether the ink chambers 111 have been refilled.

Similarly, the second time period T2 in S17 may be set longer when the number of ink chambers 111 in the ink tank 100 is greater. It is also possible that the user will refill multiple ink chambers 111 after moving the cover 70 to the exposing position. In such cases, the length of time required to refill the ink chambers 111 with ink is likely greater when the number of ink chambers 111 in the ink tank 100 is greater. Hence, adjusting the second time period T2 based on the number of ink chambers 111 in the ink tank 100 will improve the precision for inferring whether the ink chambers 111 have been refilled.

While the process in the embodiment described above performs both S15 and S17, one of the process in S15 and the process in S17 may be omitted. Further, the present embodiment describes an example of skipping the process in S15-S18 when at least one of the ink chambers 111Y, 111C, and 111M is in the soft-empty state or the ink chamber 111B is in the hard-empty state. However, the controller 130 may instead skip the process in S15-S18 when one of the ink chambers 111Y, 111C, and 111M is in the soft-empty state and the ink chamber 111B is in the hard-empty state.

The present embodiment describes an example in which the ink detection portion 152 and the residual ink sensor 73 are only provided for the tank 100B. However, the ink detection portion 152 and the residual ink sensor 73 may be provided for each of the tanks 100B, 100Y, 100C, and 100M, or for none of the tanks 100B, 100Y, 100C, and 100M. When the ink detection portions 152 and the residual ink sensors 73 are provided for all of the tanks 100B, 100Y, 100C, and 100M, in S14, S41, and S48 the controller 130 may determine whether the ink chamber 111 is in the hard-empty state for each of the tanks 100B, 100Y, 100C, and 100M. On the other hand, if the ink detection portion 152 and the residual ink sensor 73 are not provided for any of the tanks 100B, 100Y, 100C, and 100M, in S14, S41, and S48 the controller 130 may determine whether the ink chamber 111 is in the soft-empty state for each of the tanks 100B, 100Y, 100C, and 100M.

While the description has been made in detail with reference to the embodiment(s) thereof, it would be apparent to those skilled in the art that many modifications and variations may be made therein without departing from the scope of the disclosure.

What is claimed is:

1. An inkjet recording apparatus comprising:
   a tank having:
      a plurality of ink chambers each configured to store ink therein; and
      a plurality of inlets provided in one-to-one correspondence with the plurality of ink chambers, ink being injected into each of the plurality of ink chambers through corresponding one of the plurality of inlets;
   a recording head configured to eject the ink stored in each of the plurality of ink chambers to record an image on a sheet;
   a display configured to display a screen;
   an operation interface configured to receive a plurality of operations inputted by a user, the plurality of operations including a first operation, a second operation and a third operation, the operation interface being further configured to output operation signals in response to receptions of the plurality of operations;
   a memory configured to store:
      threshold values, each of the threshold values being set for each of the plurality of ink chambers;
      count values, each of the count values being set for each of the plurality of ink chambers and updated in a direction approaching corresponding one of the threshold values in accordance with ejection of the ink stored in corresponding one of the plurality of ink chambers from the recording head; and
      the operation signals outputted from the operation interface,
   a controller configured to control the recording head and the display, the controller being configured to:
      perform an inquiry process in which a displaying and receiving process is repeatedly performed for each of the plurality of ink chambers, wherein, in the displaying and receiving process, an inquiry screen targeting each of the plurality of ink chambers and including an inquiry to the user as to whether ink has been injected into a target ink chamber is displayed on the display, and an operation is received, through the operation interface, in response to the inquiry, the operation received in the displaying and receiving process being one of the first operation and the second operation;
      perform an operation determination process to determine whether all of the operations received in the inquiry process are the first operations;
      perform, in response to the determination in the operation determination process that all of the operations received in the inquiry process are the first operations, a confirmation process to display a confirmation screen on the display and to receive one of the first operation and the third operation through the operation interface, the confirmation screen prompting the user to input the third operation to confirm that ink has been injected into all of the plurality of ink chambers; and
      initialize, in response to the receipt of the third operation in the confirmation process, the count values for all of the plurality of ink chambers.

2. The inkjet recording apparatus according to claim 1, wherein the plurality of operations further includes a fourth operation different from the first operation,
   wherein the controller is configured to further perform, in response to the receipt of the first operation in the confirmation process, a warning process to display a warning screen on the display and to receive the fourth operation through the operation interface, the warning screen prompting the user to input the fourth operation, and
   wherein the controller is configured to perform again the inquiry process in response to the receipt of the fourth operation in the warning process.

3. The inkjet recording apparatus according to claim 1, further comprising:
   a cover configured to be movable between a covering position covering the plurality of inlets to restrict ink from being injected into the plurality of ink chambers and an exposing position exposing the plurality of inlets to an outside to allow ink to be injected into the plurality of ink chambers; and
   a cover sensor configured to detect a position of the cover,
   wherein the controller is configured to perform the inquiry process in response to the detection through the cover sensor that the cover has been moved from the exposing position to the covering position.

4. The inkjet recording apparatus according to claim 3, wherein the controller is configured to further perform, in response to the detection through the cover sensor that the cover has been moved from the exposing position to the covering position, a first duration determination process to determine whether an exposing time during which the cover has been in the exposing position is not less than a first time period, and
   wherein the controller is configured to initialize, in response to the determination in the first duration determination process that the exposing time is not less than the first time period and the receipt of the first operation in the confirmation process, the count values for all of the plurality of ink chambers.

5. The inkjet recording apparatus according to claim 4, wherein the controller is configured to further perform, in response to the detection through the cover sensor that the cover has been moved from the exposing position to the covering position, a second duration determination process to determine whether an exposing time during which the cover has been in the exposing position is not more than a second time period, and
   wherein the controller is configured to initialize, in response to the determination in the second duration determination process that the exposing time is not more than the second time period and the receipt of the first operation in the confirmation process, the count values for none of the plurality of ink chambers.

6. The inkjet recording apparatus according to claim 3, wherein the controller is configured to further perform, in response to the detection through the cover sensor that the cover has been moved from the exposing position to the covering position, a second duration determination process to determine whether an exposing time during which the cover has been in the exposing position is not more than a second time period, and
wherein the controller is configured to initialize, in response to the determination in the second duration determination process that the exposing time is not more than the second time period and the receipt of the first operation in the confirmation process, the count values for none of the plurality of ink chambers.

7. The inkjet recording apparatus according to claim 1, wherein the controller is configured to further perform a reception interval determination process to determine whether a time interval between reception timings of the first operations in the inquiry process is not less than a third time period, and
wherein the controller is configured to initialize, in response to the determination in the reception interval determination process that the time interval is not less than the third time period and the receipt of the first operation in the confirmation process, the count values for all of the plurality of ink chambers.

8. The inkjet recording apparatus according to claim 2, wherein the memory is configured to further store a re-inquiry flag,
wherein the controller is configured to further:
perform, in response to the receipt of the fourth operation in the warning process, a setting process to set the re-inquiry flag to a first value; and
perform a flag determination process to determine whether the re-inquiry flag has been set to the first value, and
wherein the controller is configured to initialize, in response to the determination in the operation determination process that all of the operations received in the inquiry process performed again are the first operations and the determination in the flag determination process that the re-inquiry flag has been set to the first value, the count values for all of the plurality of ink chambers.

9. The inkjet recording apparatus according to claim 2, wherein the memory is configured to further store a re-inquiry flag,
wherein the controller is configured to further:
perform, in response to the receipt of the fourth operation in the warning process, a setting process to set the re-inquiry flag to a first value; and
perform a flag determination process to determine whether the re-inquiry flag has been set to the first value, and wherein the controller is configured to initialize, in response to the determination in the operation determination process that all of the operations received in the inquiry process are the first operations and the determination in the flag determination process that the re-inquiry flag has been set to the first value, the count values for none of the plurality of ink chambers.

10. The inkjet recording apparatus according to claim 1, wherein the controller is configured:
to initialize the count value for a target ink chamber for which the first operation is received in the inquiry process; and
not to initialize the count value for a target ink chamber for which the second operation is received in the inquiry process.

11. The inkjet recording apparatus according to claim 2, wherein the operation interface has a plurality of keys operated by the user, and
wherein the controller is configured to assign an identical key to the third operation and the fourth operation.

12. The inkjet recording apparatus according to claim 1, wherein the controller is configured to further:
receive a recording instruction to record an image on a sheet;
perform, in response to the receipt of the recording instruction, an empty determination process to determine whether a quantity of the ink stored in each of the plurality of ink chambers is less than a residual ink threshold;
perform, in response to the determination in the empty determination process that the quantity of the ink stored in each of all the plurality of ink chambers is not less than the residual ink threshold, a recording process to control the recording head to record an image on a sheet;
perform an updating process to update each of the count values based on the quantity of the ink in the corresponding one of the plurality of ink chambers ejected from the recording head in the recording process; and
perform, in response to the determination in the empty determination process that the quantity of the ink stored in at least one of the plurality of ink chambers is less than the residual ink threshold, a notification process to display a notification screen on the display without performing the recording process and the updating process, the notification screen notifying the user that an image cannot be recorded until ink is injected into the ink chamber whose quantity of the ink stored therein is determined to be less than the residual ink threshold.

13. The inkjet recording apparatus according to claim 1, wherein the first operations for the plurality of ink chambers are operations pressing an identical position in the operation interface.

* * * * *